US011897555B2

United States Patent
Toko et al.

(10) Patent No.: US 11,897,555 B2
(45) Date of Patent: *Feb. 13, 2024

(54) STEERING CONTROL DEVICE

(71) Applicant: JTEKT CORPORATION, Osaka (JP)

(72) Inventors: Takahiro Toko, Takahama (JP);
Nobuaki Kataoka, Okazaki (JP);
Takafumi Yamaguchi, Kuwana (JP);
Yukinobu Ezaki, Kasugai (JP)

(73) Assignee: JTEKT CORPORATION, Kariya (JP)

( * ) Notice: Subject to any disclaimer, the term of this patent is extended or adjusted under 35 U.S.C. 154(b) by 645 days.

This patent is subject to a terminal disclaimer.

(21) Appl. No.: 17/017,828

(22) Filed: Sep. 11, 2020

(65) Prior Publication Data

US 2021/0078628 A1  Mar. 18, 2021

(30) Foreign Application Priority Data

Sep. 13, 2019 (JP) .................................. 2019-166943

(51) Int. Cl.
*B62D 6/00* (2006.01)
*B62D 5/04* (2006.01)
*B62D 15/02* (2006.01)

(52) U.S. Cl.
CPC ......... *B62D 5/0463* (2013.01); *B62D 5/0409* (2013.01); *B62D 15/0235* (2013.01); *B62D 5/0454* (2013.01)

(58) Field of Classification Search
CPC ........................... B62D 5/0463; B62D 5/0409; B62D 15/0235; B62D 5/0454; B62D 5/0466; B62D 5/0469; B62D 5/046; B62D 6/00

(Continued)

(56) References Cited

U.S. PATENT DOCUMENTS 6,408,235 B1 * 6/2002 Tanke, II ............. B62D 5/0469
180/443
6,694,237 B2 * 2/2004 Kifuku ................. B62D 5/0469
701/41

(Continued)

FOREIGN PATENT DOCUMENTS

DE  102011085382 A1   5/2013
DE  102015211711 A1  12/2016

(Continued)

OTHER PUBLICATIONS

Feb. 19, 2021 Serach Report issued in European Patent Application No. 20195731.3.

(Continued)

*Primary Examiner* — Shardul D Patel
(74) *Attorney, Agent, or Firm* — Oliff PLC

(57) ABSTRACT

A steering control device includes an electronic control unit. The electronic control unit is configured to detect an absolute steering angle, to calculate a current command value, to control driving of a motor such that an actual current value which is supplied to the motor reaches the current command value, to store an end-position-corresponding angle which is correlated with the absolute steering angle, to perform end contact relaxation control for correcting the current command value such that a decrease of an end separation angle is regulated when the end separation angle is equal to or less than a predetermined angle, and to calculate the current command value such that an increase of the end separation angle is not regulated by the end contact relaxation control when the end separation angle is equal to or less than the predetermined angle.

3 Claims, 4 Drawing Sheets

(58) Field of Classification Search
USPC .......................................................... 701/41
See application file for complete search history.

(56) References Cited

U.S. PATENT DOCUMENTS

| | | | |
|---|---|---|---|
| 2004/0098180 A1* | 5/2004 | Von Hammel | B62D 5/0469 |
| | | | 701/41 |
| 2010/0094507 A1 | 4/2010 | Mitsuhara | |
| 2014/0188337 A1* | 7/2014 | Pyo | B62D 6/10 |
| | | | 701/41 |
| 2016/0280256 A1 | 9/2016 | Wei et al. | |
| 2018/0194389 A1* | 7/2018 | Imamura | B62D 5/0469 |
| 2019/0233000 A1* | 8/2019 | Matsuda | B62D 5/006 |

FOREIGN PATENT DOCUMENTS

| | | |
|---|---|---|
| EP | 1167158 A1 | 1/2002 |
| EP | 1602993 A2 | 12/2005 |
| EP | 2361820 A2 | 8/2011 |
| JP | 2008-284889 A | 11/2008 |
| JP | 2010-089690 A | 4/2010 |
| JP | 2014-189115 A | 10/2014 |
| JP | 5962881 B1 | 8/2016 |
| JP | 2016-155519 A | 9/2016 |
| WO | 2004/022411 A1 | 3/2004 |
| WO | 2015/049861 A1 | 4/2015 |

OTHER PUBLICATIONS

Apr. 4, 2023 Office Action issued in Japanese Patent Application No. 2019-166943.

* cited by examiner

STEERING CONTROL DEVICE

CROSS-REFERENCE TO RELATED APPLICATION

This application claims priority to Japanese Patent Application No. 2019-166943 filed on Sep. 13, 2019, incorporated herein by reference in its entirety.

BACKGROUND

1. Technical Field

The disclosure relates to a steering control device.

2. Description of Related Art

In the related art, an electric power steering system (EPS) including an actuator with a motor as a drive source is known as a vehicular steering system. As such an EPS, there is an EPS that acquires a steering angle of a steering wheel as an absolute angle including a range greater than 360° and performs various types of control based on the steering angle. As an example of such control, for example, Japanese Patent No. 5962881 (JP 5962881 B) discloses that end contact relaxation control for relaxing an impact of a so-called end contact from a rack end which is an end of a rack shaft coming into contact with a rack housing is performed. In the EPS described in JP 5962881 B, an impact of an end contact is relaxed by limiting a current command value corresponding to a target value of a motor torque which is output from a motor to be equal to or less than a limit value based on a steering angle.

SUMMARY

In the configuration of the related art, when end contact relaxation control is performed, the limit value is set based on the steering angle, but a steering direction is not considered. Accordingly, in a state in which the steering wheel is steered to the vicinity of a rack end position at which movement of the rack shaft is regulated by an end contact, the current command value is limited even when return steering is performed in addition to a case in which turning steering is performed. As a result, when return steering is performed in the vicinity of the rack end position, the motor torque which is output from the motor is insufficient and thus there is concern of a so-called hooked feeling and degradation of a steering feeling.

The disclosure provides a steering control device that can curb degradation of a steering feeling.

According to an aspect of the disclosure, there is provided a steering control device that controls a steering system including a housing, a turning shaft which is accommodated in the housing to reciprocate, and an actuator which applies a motor torque for turning turning wheels connected the turning shaft using a motor as a drive source. The steering control device includes an electronic control unit. The electronic control unit is configured to detect an absolute steering angle which is a rotation angle of a rotation shaft which is able to be converted into a turning angle of the turning wheels and which is expressed as an absolute angle including a range greater than 360°, to calculate a current command value corresponding to a target value of the motor torque which is output from the motor, to control driving of the motor such that an actual current value which is supplied to the motor reaches the current command value, to store an end-position-corresponding angle which is an angle indicating an end position at which movement of the turning shaft is regulated by an end contact of the turning shaft coming into contact with the housing and which is correlated with the absolute steering angle, to perform end contact relaxation control for correcting the current command value such that a decrease of an end separation angle indicating a distance of the absolute steering angle from the end-position-corresponding angle is regulated when the end separation angle is equal to or less than a predetermined angle, and to calculate the current command value such that an increase of the end separation angle is not regulated by the end contact relaxation control when the end separation angle is equal to or less than the predetermined angle.

With this configuration, when the end separation angle is equal to or less than the predetermined angle, the current command value is calculated such that an increase of the end separation angle is not regulated by the end contact relaxation control. Accordingly, for example, since the motor torque is not likely to be insufficient when return steering is performed in the vicinity of the end position, a hooked feeling is not easily caused and it is possible to curb degradation of a steering feeling.

In the aspect, the electronic control unit may be configured to calculate a steering angle limit value which decreases based on a decrease of the end separation angle when the end separation angle is equal to or less than the predetermined angle, to perform the end contact relaxation control by limiting the absolute value of the current command value to the steering angle limit value, to calculate an angle limiting component which increases based on the decrease of the end separation angle when the end separation angle is equal to or less than the predetermined angle, to calculate the steering angle limit value based on a pre-adjustment steering angle limit value which is obtained by subtracting the angle limiting component from a rated current of the motor, and to set the absolute value of the steering angle limit value to the rated current when the end separation angle is equal to or less than the predetermined angle and the end separation angle increases.

With this configuration, in performing the end contact relaxation control such that the current command value is limited to be equal to or less than the steering angle limit value, the absolute value of the steering angle limit value is set to the rated current when the end separation angle is equal to or less than the predetermined angle and the end separation angle increases. Accordingly, the absolute value of the current command value is not limited and the increase of the end separation angle is suitably not regulated.

In the aspect, when the sign of the current command value for causing the motor to generate the motor torque for turning the turning wheels to one side of right and left sides is defined as being positive and the sign of the current command value for causing the motor to generate the motor torque for turning the turning wheels to the other side is defined as being negative, the electronic control unit may be configured to set the absolute value of the steering angle limit value to the rated current when the turning wheels are turned to the one side, the end separation angle is equal to or less than the predetermined angle, and the current command value before being corrected is less than a positive pre-adjustment steering angle limit value and to set the absolute value of the steering angle limit value to the pre-adjustment steering angle limit value when the turning wheels are turned to the one side, the end separation angle is equal to or less than the predetermined angle, and the current command value before being corrected is equal to or greater than the positive pre-adjustment steering angle limit value; and the electronic control unit may be configured to set the absolute value of the steering angle limit value to the rated current when the turning wheels are turned to the other side, the end separation angle is equal to or less than the predetermined angle, and the current command value before being corrected is greater than a negative pre-adjustment steering angle limit value and to set the absolute value of the steering angle limit value to the pre-adjustment steering angle limit value when the turning wheels are turned to the other side, the end separation angle is equal to or less than the predetermined angle, and the current command value before being corrected is equal to or less than the negative pre-adjustment steering angle limit value.

With this configuration, by performing the magnitude comparison in consideration of the signs of the current command value before being corrected and the pre-adjustment steering angle limit value, the absolute value of the steering angle limit value can be easily set to an appropriate value corresponding to steering even when it is not directly determined whether return steering or turning steering is performed based on state quantities such as a steering torque.

In the aspect, the electronic control unit may be configured to compare a one-side end separation angle indicating a distance of the absolute steering angle from the end-position-corresponding angle on the one side and an other-side end separation angle indicating a distance of the absolute steering angle from the end-position-corresponding angle on the other side with a preset end separation angle threshold value, to determine that the turning wheels are turned to the one side when the absolute value of the one-side end separation angle is less than the end separation angle threshold value, and to determine that the turning wheels are turned to the other side when the absolute value of the other-side end separation angle is less than the end separation angle threshold value.

With this configuration, the direction in which the turning wheels are turned can be easily determined based on the absolute values of the one-direction end separation angle and the other-direction end separation angle.

According to the disclosure, it is possible to curb degradation of a steering feeling.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
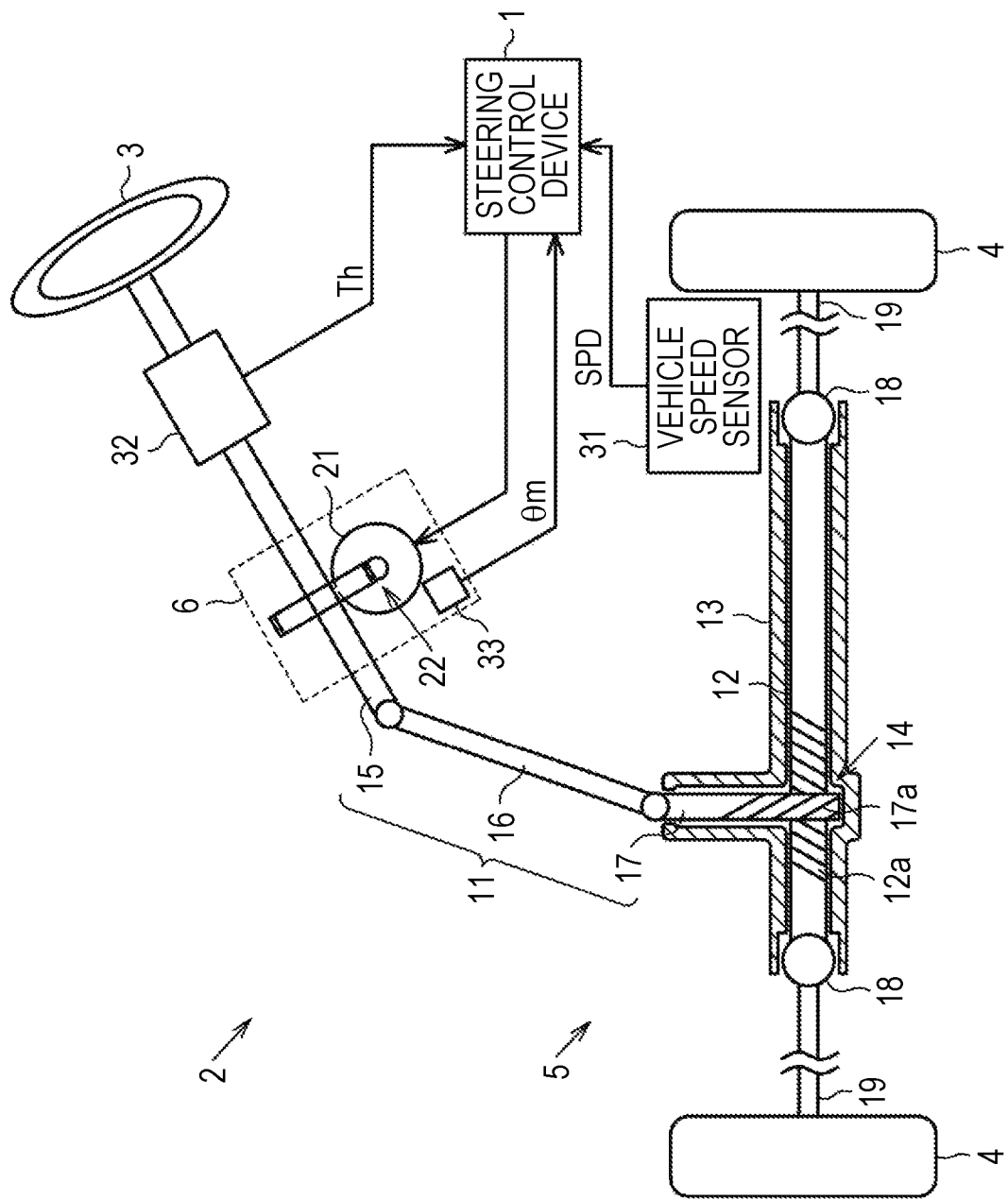
FIG. 1 is a diagram schematically illustrating a configuration of an electric power steering system.

Hereinafter, a steering control device according to an embodiment of the disclosure will be described with reference to the accompanying drawings. As illustrated in FIG. 1, an electric power steering system (EPS) 2 which is a steering system to be controlled by a steering control device 1 includes a steering mechanism 5 that turns turning wheels 4 based on a driver's operation of a steering wheel 3. The EPS 2 includes an EPS actuator 6 which is an actuator that applies an assist force for assisting with a steering operation to the steering mechanism 5.

The steering mechanism 5 includes a steering shaft 11 to which the steering wheel 3 is fixed, a rack shaft 12 which is a turning shaft connected to the steering shaft 11, a rack housing 13 which is a housing into which the rack shaft 12 is inserted to reciprocate, and a rack and pinion mechanism 14 that converts rotation of the steering shaft 11 to the rack shaft 12. The steering shaft 11 has a configuration in which a column shaft 15, an intermediate shaft 16, and a pinion shaft 17 are connected sequentially from the side on which the steering wheel 3 is located.

The rack shaft 12 and the pinion shaft 17 are arranged with a predetermined crossing angle in the rack housing 13. The rack and pinion mechanism 14 has a configuration in which rack teeth 12a formed on the rack shaft 12 and pinion teeth 17a formed on the pinion shaft 17 engage with each other. Tie rods 19 are rotatably connected to both ends of the rack shaft 12 via rack ends 18 formed of a ball joint provided at each shaft end. The tips of the tie rods 19 are connected to knuckles (not illustrated) to which the turning wheels 4 are assembled. Accordingly, in the EPS 2, rotation of the steering shaft 11 based on a steering operation is converted to movement in an axial direction of the rack shaft 12 by the rack and pinion mechanism 14 and the movement in the axial direction is transmitted to the knuckles via the tie rods 19, whereby a turning angle of the turning wheels 4, that is, a travel direction of the vehicle, is changed.

A position of the rack shaft 12 at which the rack end 18 comes into contact with the left end of the rack housing 13 is a position at which the steering wheel can be maximally steered to the right side, and this position corresponds to a rack end position which is a right end position. A position of the rack shaft 12 at which the rack end 18 comes into contact with the right end of the rack housing 13 is a position at which the steering wheel can be maximally steered to the left side, and this position corresponds to a rack end position which is a left end position.

The EPS actuator 6 includes a motor 21 which is a drive source and a reduction gear mechanism 22 such as a worm and wheel. The motor 21 is connected to the column shaft 15 via the reduction gear mechanism 22. The EPS actuator 6 applies a motor torque as an assist force to the steering mechanism 5 by reducing rotation of the motor 21 using the reduction gear mechanism 22 and transmitting the reduced rotation to the column shaft 15. A three-phase brushless motor is employed as the motor 21 according to this embodiment.

The steering control device 1 is connected to the motor 21 and controls the operation thereof. The steering control device 1 includes a central processing unit (CPU) and a memory which are not illustrated and the CPU executes a program stored in the memory every predetermined calculation cycle. Accordingly, various types of control are performed. That is, the steering control device 1 includes an electronic control unit (ECU).

A vehicle speed sensor 31 that detects a vehicle speed SPD of the vehicle and a torque sensor 32 that detects a steering torque Th which is applied to the steering shaft 11 according to a driver's steering are connected to the steering control device 1. A rotation sensor 33 that detects a rotation angle θm of the motor 21 as a relative angle in a range of 360° is connected to the steering control device 1. The steering torque Th and the rotation angle θm are detected as positive values when the steering wheel is steered to the right side and are detected as negative values when the steering wheel is steered to the left side. The steering control device 1 controls the operation of the EPS actuator 6, that is, an assist force which is applied to the steering mechanism 5 such that the rack shaft 12 can reciprocate, by supplying drive power to the motor 21 based on signals indicating state quantities which are input from the sensors.

Figure 2:
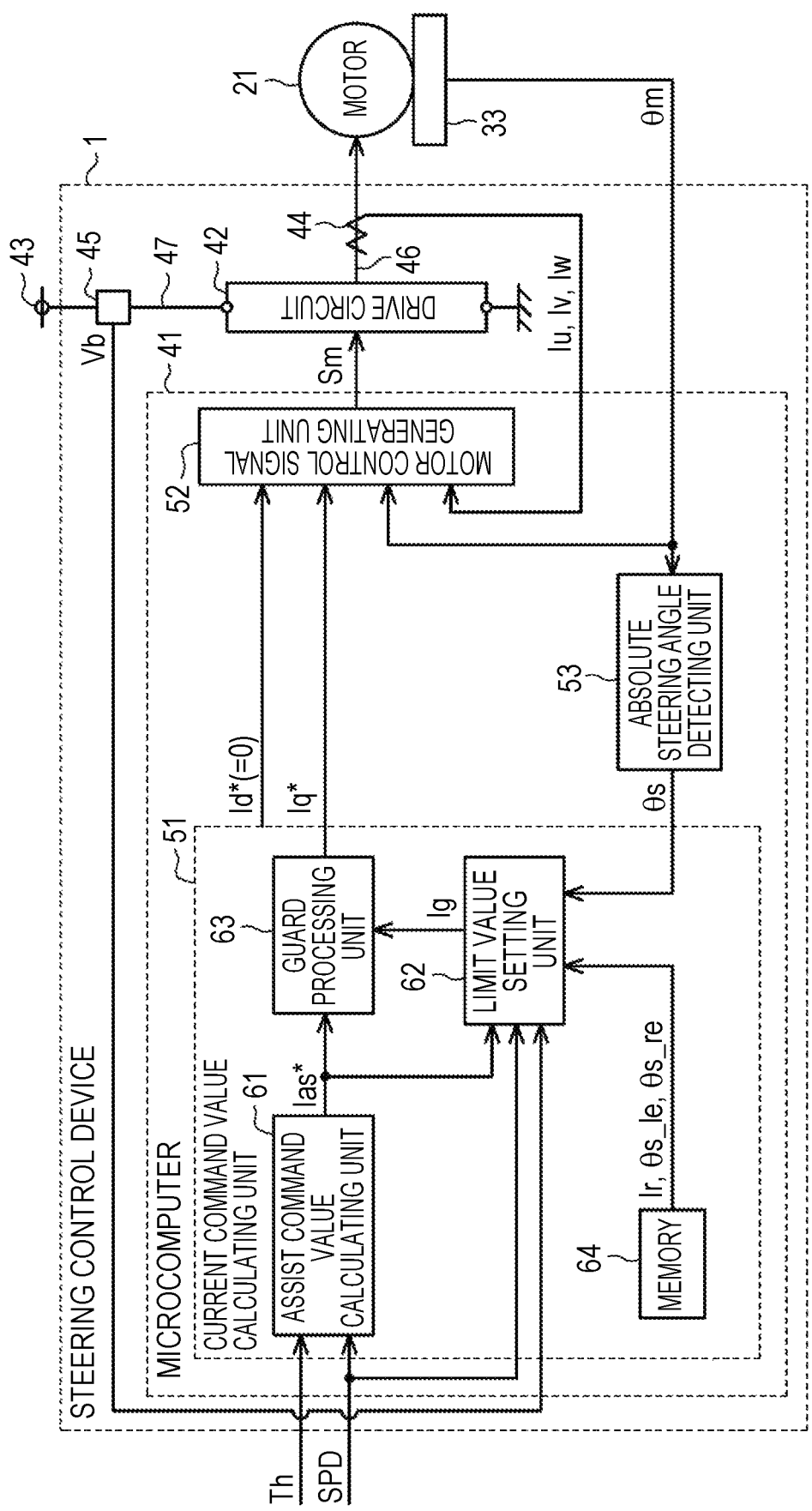
FIG. 2 is a block diagram illustrating a steering control device.

The configuration of the steering control device 1 will be described below. As illustrated in FIG. 2, the steering control device 1 includes a microcomputer 41 that outputs a motor control signal Sm and a drive circuit 42 that supplies drive power to the motor 21 based on the motor control signal Sm. In this embodiment, a known PWM (Pulse Width Modulation) inverter including a plurality of switching elements such as FETs is employed as the drive circuit 42. The motor control signal Sm output from the microcomputer 41 defines ON and OFF states of the switching elements. Accordingly, the switching elements are turned on and off in response to the motor control signal Sm and a power supply pattern to motor coils is switched in phases, whereby a DC power of an onboard power supply 43 is converted into three-phase drive power and is output to the motor 21.

Control blocks which will be described below are realized by a computer program which is executed by the microcomputer 41, state quantities are detected every predetermined sampling cycle, and calculation processes assigned to the following control blocks are performed every predetermined calculation cycle.

The vehicle speed SPD, the steering torque Th, and the rotation angle θm of the motor 21 are input to the microcomputer 41. Phase current values Iu, Iv, and Iw of the motor 21 which are detected by a current sensor 44 and a source voltage Vb of an onboard power supply 43 which is detected by a voltage sensor 45 are also input to the microcomputer 41. The current sensor 44 is provided in a connection line 46 between the drive circuit 42 and a motor coil of each phase. The voltage sensor 45 is provided in a connection line 47 between the onboard power supply 43 and the drive circuit 42. In FIG. 2, for the purpose of convenience of description, one of each of the current sensors 44 of the phases and the connection lines 46 of the phases is illustrated. The microcomputer 41 outputs the motor control signal Sm based on the input state quantities.

Specifically, the microcomputer 41 includes a current command value calculating unit 51 that calculates current command values Id* and Iq*, a motor control signal generating unit 52 that outputs the motor control signal Sm based on the current command values Id* and Iq*, and an absolute steering angle detecting unit 53 that detects an absolute steering angle θs.

The vehicle speed SPD, the steering torque Th, and the absolute steering angle θs are input to the current command value calculating unit 51. The current command value calculating unit 51 calculates the current command values Id* and Iq* based on the input state quantities. The current command values Id* and Iq* are target values of currents to be supplied to the motor 21 and are a current command value on a d axis and a current command value on a q axis, respectively, in a d/q coordinate system. Among these, the q-axis current command value Iq* represents a target value of a motor torque which is output from the motor 21. In this embodiment, the d-axis current command value Id* is basically fixed to zero. For example, the current command values Id* and Iq* have positive values when steering to the right side is assisted with and have negative values when steering to the left side is assisted with.

The current command values Id* and Iq*, the phase current values Iu, Iv, and Iw, and the rotation angle θm of the motor 21 are input to the motor control signal generating unit 52. The motor control signal generating unit 52 generates the motor control signal Sm by performing current feedback control in the d/q coordinate system based on the input state quantities.

Specifically, the motor control signal generating unit 52 calculates a d-axis current value Id and a q-axis current value Iq which are actual current values of the motor 21 in the d/q coordinate system by mapping the phase current values Iu, Iv, and Iw onto the d/q coordinate system based on the rotation angle θm. The motor control signal generating unit 52 generates the motor control signal Sm by performing current feedback control such that the d-axis current value Id follow the d-axis current command value Id* and the q-axis current value Iq follows the q-axis current command value Iq*.

The motor control signal generating unit 52 outputs the generated motor control signal Sm to the drive circuit 42. Accordingly, by supplying drive power based on the motor control signal Sm to the motor 21 and outputting a motor torque based on the q-axis current command value Iq* from the motor 21, an assist force is applied to the steering mechanism 5.

The rotation angle θm is input to the absolute steering angle detecting unit 53. The absolute steering angle detecting unit 53 detects an absolute motor angle which is expressed as an absolute angle including a range greater than 360° based on the rotation angle θm. The absolute steering angle detecting unit 53 in this embodiment integrates a rotation speed of the motor 21, for example, with an origin at the rotation angle θm when a start switch such as an ignition switch is turned on for the first time after the onboard power supply 43 has been replaced, and detects an absolute motor angle based on the integrated rotation speed and the rotation angle θm. Then, the absolute steering angle detecting unit 53 detects an absolute steering angle θs indicating a steering angle of the steering shaft 11 by multiplying the absolute motor angle by a conversion factor based on a reduction gear ratio of the reduction gear mechanism 22. In the steering control device 1 according to this embodiment, rotation of the motor 21 is monitored when the start switch is turned off, and the rotation speed of the motor 21 is normally integrated. Accordingly, even when the start switch is turned on a second time or later after the onboard power supply 43 has been replaced, the origin of the absolute steering angle θs is the same as the origin which was set when the start switch was turned on for the first time.

Since the turning angle of the turning wheels 4 is changed by the rotation of the steering shaft 11 as described above, the absolute steering angle θs indicates a rotation angle of a rotation shaft which can be converted to the turning angle of the turning wheels 4. The absolute motor angle and the absolute steering angle θs have positive values when they are angles turned to the right side from the origin and have negative values when they are angles turned to the left side from the origin.

The configuration of the current command value calculating unit 51 will be described below. The current command value calculating unit 51 includes an assist command value calculating unit 61 that calculates an assist command value Ias* which is a base component of the q-axis current command value Iq*. The current command value calculating unit 51 further includes a limit value setting unit 62 that sets a limit value Ig which is an upper limit of the absolute value of the q-axis current command value Iq* and a guard processing unit 63 that limits the absolute value of the assist command value Ias* to be equal to or less than the limit value Ig. The memory 64 is connected to the limit value setting unit 62.

The steering torque Th and the vehicle speed SPD are input to the assist command value calculating unit 61. The assist command value calculating unit 61 calculates the assist command value Ias* based on the steering torque Th and the vehicle speed SPD. Specifically, the assist command value calculating unit 61 calculates the assist command value Ias* to have a larger absolute value as the absolute value of the steering torque Th becomes greater and as the vehicle speed SPD becomes lower. The absolute value of the assist command value Ias* is calculated to be equal to or less than a rated current Ir which is a maximum current corresponding to a torque which is set in advance as the motor torque which can be output from the motor 21. The calculated assist command value Ias* is output to the guard processing unit 63.

The limit value Ig which is set by the limit value setting unit 62 in addition to the assist command value Ias* is input to the guard processing unit 63 as will be described later. When the absolute value of the input assist command value Ias* is equal to or less than the limit value Ig, the guard processing unit 63 outputs the value of the assist command value Ias* to the motor control signal generating unit 52 as the q-axis current command value Iq*. On the other hand, when the absolute value of the input assist command value Ias* is greater than the limit value Ig, the guard processing unit 63 outputs a value obtained by limiting the absolute value of the assist command value Ias* to the limit value Ig to the motor control signal generating unit 52 as the q-axis current command value Iq*.

The rated current Ir, end-position-corresponding angles θs_le and θs_re, and the like are stored in a memory 64. The left end-position-corresponding angle θs_le is the absolute steering angle θs corresponding to the left rack end position, and the right end-position-corresponding angle θs_re is the absolute steering angle θs corresponding to the right rack end position. The end-position-corresponding angles θs_le and θs_re are set, for example, by proper learning which is performed based on a driver's steering.

The configuration of the limit value setting unit 62 will be described below. The absolute steering angle θs, the vehicle speed SPD, the source voltage Vb, the assist command value Ias*, the rated current Ir, and the end-position-corresponding angles θs_le and θs_re are input to the limit value setting unit 62. The limit value setting unit 62 sets the limit value Ig based on the input state quantities.

Figure 3:
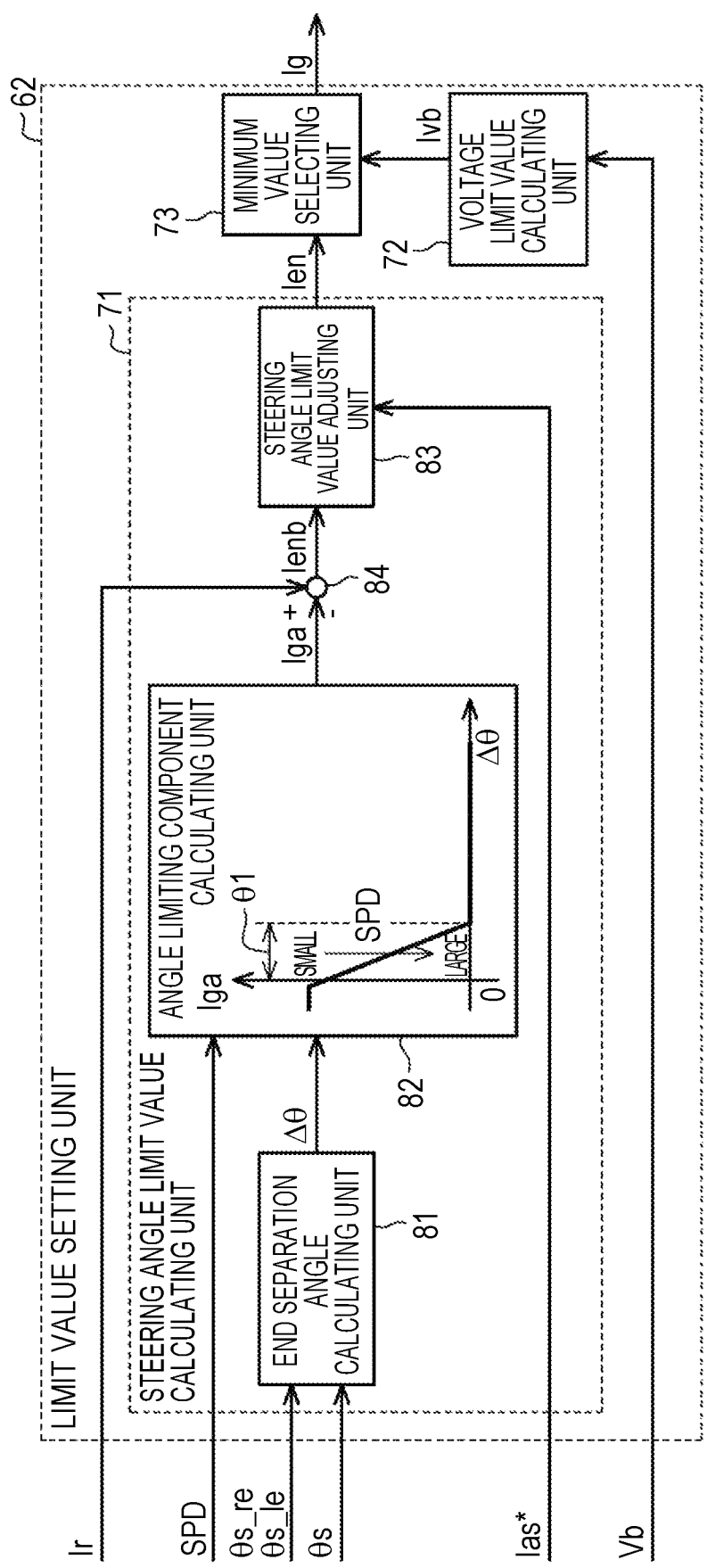
FIG. 3 is a block diagram illustrating a limit value setting unit.

Specifically, as illustrated in FIG. 3, the limit value setting unit 62 includes a steering angle limit value calculating unit 71 that calculates a steering angle limit value Ien based on the absolute steering angle θs, a voltage limit value calculating unit 72 that calculates a voltage limit value Ivb which is another limit value based on the source voltage Vb, and a minimum value selecting unit 73 that selects the smaller of the steering angle limit value Ien and the voltage limit value Ivb.

The absolute steering angle θs, the vehicle speed SPD, the assist command value Ias*, the rated current Ir, and the end-position-corresponding angles θs_le and θs_re are input to the steering angle limit value calculating unit 71. The steering angle limit value calculating unit 71 calculates the steering angle limit value Ien which decreases with a decrease of an end separation angle Δθ indicating a minimum distance of the absolute steering angle θs from the left and right end-position-corresponding angles θs_le and θs_re based on the input state quantities when the end separation angle Δθ is equal to or less than a predetermined angle θ1 as will be described later. The calculated steering angle limit value Ien is output to the minimum value selecting unit 73.

The source voltage Vb is input to the voltage limit value calculating unit 72. The voltage limit value calculating unit 72 calculates the voltage limit value Ivb less than a rated voltage for supplying the rated current Ir when the absolute value of the source voltage Vb is equal to or less than a preset voltage threshold value Vth. Specifically, when the absolute value of the source voltage Vb is equal to or less than the voltage threshold value Vth, the voltage limit value calculating unit 72 calculates the voltage limit value Ivb having a less absolute value with a decrease of the absolute value of the source voltage Vb. The calculated voltage limit value Ivb is output to the minimum value selecting unit 73.

The minimum value selecting unit 73 selects the smaller of the steering angle limit value Ien and the voltage limit value Ivb as the limit value Ig and outputs the selected one to the guard processing unit 63. By outputting the steering angle limit value Ien to the guard processing unit 63 as the limit value Ig, the absolute value of the q-axis current command value Iq* is limited to the steering angle limit value Ien. Accordingly, end contact relaxation control for relaxing an impact of an end contact is performed by decreasing the absolute value of the q-axis current command value Iq* based on the decrease of the end separation angle Δθ when the end separation angle Δθ is equal to or less than the predetermined angle θ1. The current command value calculating unit 51 in this embodiment corrects the q-axis current command value Iq* such that the absolute value of the q-axis current command value Iq* is limited to be equal to or less than the limit value Ig. Since the assist command value Ias* as a base component of the q-axis current command value Iq* is input to the guard processing unit 63 as described above, the assist command value Ias* corresponds to a current command value before being corrected.

By outputting the voltage limit value Ivb as the limit value Ig to the guard processing unit 63, the absolute value of the q-axis current command value Iq* is limited to the voltage limit value Ivb. Accordingly, when the absolute value of the source voltage Vb is equal to or less than the voltage threshold value Vth, power supply protection control for decreasing the absolute value of the q-axis current command value Iq* with a decrease of the absolute value of the source voltage Vb is performed.

The configuration of the steering angle limit value calculating unit 71 will be described below. The steering angle limit value calculating unit 71 includes an end separation angle calculating unit 81 that calculates the end separation angle Δθ and an angle limiting component calculating unit 82 that calculates an angle limiting component Iga which is a current limit which is determined based on the end separation angle Δθ, and calculates a pre-adjustment steering angle limit value Ienb by subtracting the angle limiting component Iga from the rated current Ir. The steering angle limit value calculating unit 71 further includes a steering angle limit value adjusting unit 83 that calculates a steering angle limit value Ien based on the pre-adjustment steering angle limit value Ienb.

Specifically, the absolute steering angle θs and the end-position-corresponding angles θs_le and θs_re are input to the end separation angle calculating unit 81. The end separation angle calculating unit 81 calculates a left end separation angle Δθl which is a difference between the absolute steering angle θs and the left end-position-corresponding angle θs_le in the newest calculation cycle and a right end separation angle Δθr which is a difference between the absolute steering angle θs and the right end-position-corresponding angle θs_re in the newest calculation cycle. Then, the end separation angle calculating unit 81 outputs one of the smaller absolute value of the right end separation angle Δθr and the left end separation angle Δθl as the end separation angle Δθ to the angle limiting component calculating unit 82.

The end separation angle calculating unit 81 sets a value of a steering angle position flag F indicating a position at which the steering wheel 3 is steered by comparing the absolute values of the right end separation angle Δθr and the left end separation angle Δθl with a preset end separation angle threshold value Δθth. The end separation angle threshold value Δθth indicates a threshold value for determining to which of the right and the left the steering wheel 3 is steered and is set to a large value of several hundreds.

Specifically, when the absolute value of the right end separation angle Δθr is less than the end separation angle threshold value Δθth, the end separation angle calculating unit 81 sets the value of the steering angle position flag F to "1" which indicates that the steering wheel 3 is steered in the positive direction, that is, that the turning wheels 4 are turned in the positive direction. When the absolute value of the left end separation angle Δθl is less than the end separation angle threshold value Δθth, the end separation angle calculating unit 81 sets the value of the steering angle position flag F to "2" which indicates that the steering wheel 3 is steered in the negative direction, that is, the turning wheels 4 are turned in the negative direction. When the right end separation angle Δθr is equal to or greater than the end separation angle threshold value Δθth and the left end separation angle Δθl is equal to or greater than the end separation angle threshold value Δθth, the end separation angle calculating unit 81 sets the value of the steering angle position flag F to "0" which indicates that the steering wheel 3 is located in the vicinity of a neutral position.

The end separation angle Δθ and the vehicle speed SPD are input to the angle limiting component calculating unit 82. The angle limiting component calculating unit 82 includes a map in which a relationship between the end separation angle Δθ and the vehicle speed SPD and the angle limiting component Iga is defined and calculates the angle limiting component Iga corresponding to the end separation angle Δθ and the vehicle speed SPD with reference to the map.

In this map, the angle limiting component Iga is set to decrease in proportion to an increase of the end separation angle Δθ from a zero state, to reach zero when the end separation angle Δθ is a predetermined angle θ1, and to be zero when the end separation angle Δθ is greater than the predetermined angle θ1. In this map, an area in which the end separation angle Δθ is negative is also set, and the angle limiting component Iga increases in proportion to a decrease of the end separation angle Δθ when the end separation angle Δθ becomes less than zero and is kept constant after angle limiting component Iga becomes the rated current Ir. The negative area in the map is assumed to be a degree by which the motor 21 rotates with elastic deformation of the EPS 2 by performing more turning steering in a state in which the rack end 18 comes into contact with the rack housing 13. The predetermined angle θ1 is set to a small angle indicating a range close to the end-position-corresponding angles θs_le and θs_re. That is, the angle limiting component Iga is set to decrease when the absolute steering angle θs transitions from the end-position-corresponding angles θs_le and θs_re to the neutral position of steering and to be zero when the absolute steering angle θs is located closer to the neutral position of steering than the vicinities of the end-position-corresponding angles θs_le and θs_re.

In this map, the angle limiting component Iga is set to decrease with an increase of the vehicle speed SPD in an area in which the end separation angle Δθ is equal to or less than the predetermined angle θ1. Specifically, the angle limiting component Iga is set to be greater than zero when the vehicle speed SPD is in a low-speed area, and the angle limiting component Iga is set to be zero when the vehicle speed SPD is in a middle-speed or high-speed area.

The calculated angle limiting component Iga is output to a subtractor 84. The rated current Ir in addition to the angle limiting component Iga is input to the subtractor 84. The steering angle limit value calculating unit 71 outputs a value, which is obtained by subtracting the angle limiting component Iga from the rated current Ir in the subtractor 84, as a pre-adjustment steering angle limit value Ienb to the steering angle limit value adjusting unit 83. The steering angle limit value adjusting unit 83 calculates the steering angle limit value Ien by adjusting the pre-adjustment steering angle limit value Ienb and outputs the steering angle limit value Ien to the minimum value selecting unit 73.

The configuration of the steering angle limit value adjusting unit 83 will be described below. The assist command value Ias* in addition to the pre-adjustment steering angle limit value Ienb is input to the steering angle limit value adjusting unit 83. When steering is performed to the right side, that is, in the positive direction, the steering angle limit value adjusting unit 83 compares the assist command value Ias* with the pre-adjustment steering angle limit value Ienb with a positive sign (hereinafter referred to as a positive pre-adjustment steering angle limit value Ienb). When the assist command value Ias* is less than the positive pre-adjustment steering angle limit value Ienb, the steering angle limit value adjusting unit 83 sets the absolute value of the steering angle limit value Ien to the rated current Ir. On the other hand, when the assist command value Ias* is equal to or greater than the positive pre-adjustment steering angle limit value Ienb, the steering angle limit value adjusting unit 83 sets the absolute value of the steering angle limit value Ien to the pre-adjustment steering angle limit value Ienb without any change.

When steering is performed to the left side, that is, in the negative direction, the steering angle limit value adjusting unit 83 compares the assist command value Ias* with the pre-adjustment steering angle limit value Ienb with a negative sign (hereinafter referred to as a negative pre-adjustment steering angle limit value Ienb). When the assist command value Ias* is equal to or less than the negative pre-adjustment steering angle limit value Ienb, the steering angle limit value adjusting unit 83 sets the absolute value of the steering angle limit value Ien to the pre-adjustment steering angle limit value Ienb without any change. On the other hand, when the assist command value Ias* is greater than the negative pre-adjustment steering angle limit value Ienb, the steering angle limit value adjusting unit 83 sets the absolute value of the steering angle limit value Ien to the rated current Ir.

When steering is performed in the positive direction, it can be determined that turning steering in which the end separation angle Δθ decreases is performed when the assist command value Ias* has a positive value and that return steering in which the end separation angle Δθ increases is performed when the assist command value Ias* has a negative value. Accordingly, one of turning steering and return steering is performed when the assist command value Ias* is less than the positive pre-adjustment steering angle limit value Ienb, and turning steering is performed when the assist command value Ias* is equal to or greater than the positive pre-adjustment steering angle limit value Ienb. In other words, when steering is performed in the positive direction and return steering is performed, the assist command value Ias* is less than the positive pre-adjustment steering angle limit value Ienb.

Similarly, when steering is performed in the negative direction, it can be determined that turning steering in which the end separation angle $\Delta\theta$ decreases is performed when the assist command value Ias* has a negative value and that turning steering in which the end separation angle $\Delta\theta$ increases is performed when the assist command value Ias* has a positive value. Accordingly, turning steering is performed when the assist command value Ias* is equal to or less than the negative pre-adjustment steering angle limit value Ienb, and one of turning steering and return steering is performed when the assist command value Ias* is greater than the negative pre-adjustment steering angle limit value Ienb. In other words, when steering is performed in the negative direction and return steering is performed, the assist command value Ias* is greater than the negative pre-adjustment steering angle limit value Ienb.

That is, the steering angle limit value adjusting unit 83 in this embodiment sets the absolute value of the steering angle limit value Ien to the rated current Ir at least when return steering is performed. Accordingly, when power supply protection control is not performed and the steering angle limit value Ien is the limit value Ig, the assist command value Ias* is output as the q-axis current command value Iq* without any change and correction of the q-axis current command value Iq* through end contact relaxation control is not performed even when the end separation angle $\Delta\theta$ is equal to or less than the predetermined angle $\theta 1$. When power supply protection control is performed and the voltage limit value Ivb is the limit value Ig, the q-axis current command value Iq* is limited even when the end separation angle $\Delta\theta$ is equal to or less than the predetermined angle $\theta 1$ and return steering is performed.

Figure 4:
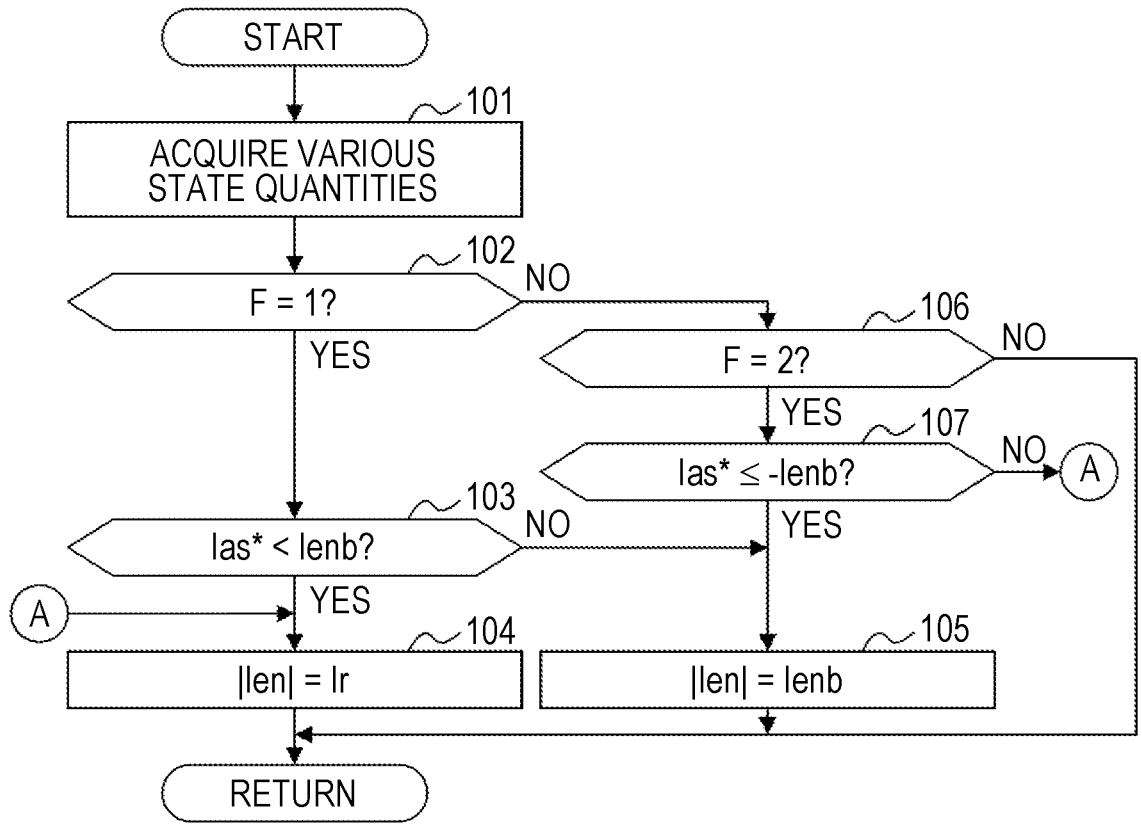
FIG. 4 is a flowchart illustrating a process flow associated with adjustment of a steering angle limit value in a steering angle limit value adjusting unit.

Specifically, as illustrated in the flowchart of FIG. 4, when various state quantities are acquired (Step 101), the steering angle limit value adjusting unit 83 determines whether the steering angle position flag F is set to "1," that is, whether steering is performed to the right side (Step 102). When the steering angle position flag F is set to "1" (Step S102: YES), it is determined whether the assist command value Ias* is less than the positive pre-adjustment steering angle limit value Ienb (Step 103). When the assist command value Ias* is less than the positive pre-adjustment steering angle limit value Ienb (Step 103: YES), the absolute value of the steering angle limit value Ien is set to the rated current Ir (Step 104). On the other hand, when the assist command value Ias* is equal to or greater than the positive pre-adjustment steering angle limit value Ienb (Step 103: NO), the absolute value of the steering angle limit value Ien is set to the pre-adjustment steering angle limit value Ienb (Step 105).

When the steering angle position flag F is not set to "1" (Step 102: NO), the steering angle limit value adjusting unit 83 determines whether the steering angle position flag F is set to "2," that is, whether steering is performed to the left side (Step 106). When the steering angle position flag F is set to "2" (Step 106: YES), it is determined whether the assist command value Ias* is equal to or less than the negative pre-adjustment steering angle limit value Ienb (Step 107). When the assist command value Ias* is equal to or less than the negative pre-adjustment steering angle limit value Ienb (Step 107: YES), the absolute value of the steering angle limit value Ien is set to the pre-adjustment steering angle limit value Ienb in Step 105. On the other hand, when the assist command value Ias* is greater than the negative pre-adjustment steering angle limit value Ienb (Step 107: NO), the absolute value of the steering angle limit value Ien is set to the rated current Ir in Step 104.

When it is determined in Step 106 that the steering angle position flag F is not set to "2," that is, when the steering angle position flag F is set to "0" and the steering wheel 3 is located in the vicinity of the neutral position (Step 106: NO), the steering angle limit value adjusting unit 83 does not perform the processes subsequent thereto.

Figure 5:
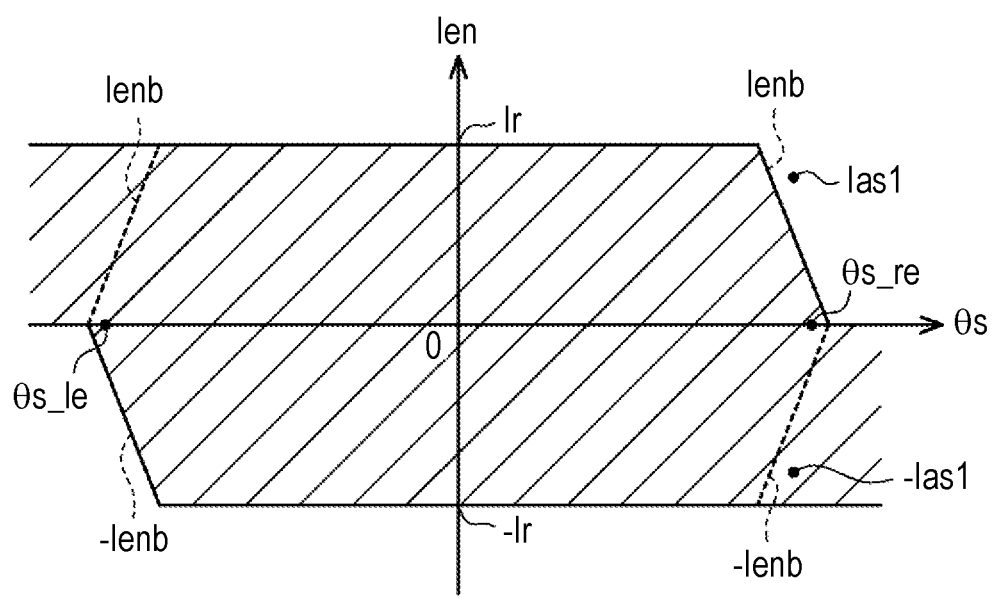
FIG. 5 is a graph illustrating a relationship between an absolute steering angle and a steering angle limit value.

Operations in this embodiment will be described below. As illustrated in FIG. 5, the steering angle limit value Ien is set in consideration of the steering direction in the absolute steering angle $\theta s$. In the drawing, the pre-adjustment steering angle limit value Ienb is indicated by a dotted line. When the assist command value Ias* is plotted in the drawing, an area in which the absolute value of the steering angle limit value Ien is the rated current Ir is illustrated to be hatched.

For example, it is assumed that the end separation angle $\Delta\theta$ becomes equal to or less than the predetermined angle $\theta 1$ by steering to the right side and the absolute value of the assist command value Ias* becomes a predetermined value Ias1 greater than the pre-adjustment steering angle limit value Ienb by further performing turning steering. In this case, the absolute value of the steering angle limit value Ien becomes the pre-adjustment steering angle limit value Ienb less than the predetermined value Ias1 and the absolute value of the q-axis current command value Iq* is limited to the steering angle limit value Ien. Accordingly, an impact of an end contact is relaxed.

Here, it is assumed that the sign of the assist command value Ias* is negative and the absolute value thereof becomes a predetermined value "Ias1" greater than the pre-adjustment steering angle limit value Ienb by performing return steering after the end separation angle $\Delta\theta$ becomes equal to or less than the predetermined angle $\theta 1$ by steering to the right side. In a comparative example in which the steering angle limit value Ien is calculated without considering the steering direction, since the absolute value of the steering angle limit value Ien is the pre-adjustment steering angle limit value Ienb, the absolute value of the q-axis current command value Iq* is limited to the steering angle limit value Ien which is less than the predetermined value Ias1. Accordingly, an assist force may be insufficient and a hooked feeling may be caused.

In this regard, in this embodiment, when the end separation angle $\Delta\theta$ is equal to or less than the predetermined angle $\theta 1$ and returning steering is performed, the absolute value of the steering angle limit value Ien is the rated current Ir and thus the absolute value of the q-axis current command value Iq* is not limited to the predetermined value Ias1. Accordingly, since a sufficient assist force is applied to the steering mechanism 5, a hooked feeling is not easily caused.

Advantages of this embodiment will be described below. The current command value calculating unit 51 calculates the q-axis current command value Iq* such that an increase of the end separation angle $\Delta\theta$ is not regulated through end contact relaxation control when the end separation angle $\Delta\theta$ is equal to or less than the predetermined angle $\theta 1$. Accordingly, for example, since an assist force which is applied to the steering mechanism 5 is not easily insufficient when return steering is performed from the vicinity of the rack end position, a hooked feeling is not likely to be caused and it is possible to curb degradation in a steering feeling.

The current command value calculating unit 51 performs end contact relaxation control by limiting the absolute value of the q-axis current command value Iq* to the steering angle limit value Ien. The steering angle limit value calculating unit 71 sets the absolute value of the steering angle limit value Ien to the rated current Ir when the end separation angle $\Delta\theta$ is equal to or less than the predetermined angle $\theta1$ and return steering in which the end separation angle $\Delta\theta$ increases is performed. Accordingly, when power supply protection control is not performed, the absolute value of the q-axis current command value Iq* is not limited and the increase of the end separation angle $\Delta\theta$ is not regulated suitably.

When the turning wheels 4 are turned to the right side and the end separation angle $\Delta\theta$ is equal to or less than the predetermined angle $\theta1$, the steering angle limit value calculating unit 71 sets the absolute value of the steering angle limit value Ien to the rated current Ir when the assist command value Ias* is less than the positive pre-adjustment steering angle limit value Ienb, and sets the absolute value of the steering angle limit value Ien to the pre-adjustment steering angle limit value Ienb when the assist command value Ias* is equal to or greater than the positive pre-adjustment steering angle limit value Ienb. When the turning wheels 4 are turned to the left side and the end separation angle $\Delta\theta$ is equal to or less than the predetermined angle $\theta1$, the steering angle limit value adjusting unit 83 sets the absolute value of the steering angle limit value Ien to the rated current Ir when the assist command value Ias* is equal to or greater than the negative pre-adjustment steering angle limit value Ienb and sets the absolute value of the steering angle limit value Ien to the pre-adjustment steering angle limit value Ienb when the assist command value Ias* is less than the negative pre-adjustment steering angle limit value Ienb. In this way, the steering angle limit value calculating unit 71 can easily set the absolute value of the steering angle limit value Ien to an appropriate value corresponding to steering by comparing the assist command value Ias* with the pre-adjustment steering angle limit value Ienb in consideration of the sign, for example, even when it is not directly determined whether return steering or turning steering is performed based on the state quantities such as the steering torque Th.

The steering angle limit value calculating unit 71 compares the absolute values of the right end separation angle $\Delta\theta r$ and the left end separation angle $\Delta\theta l$ with the end separation angle threshold value $\Delta\theta th$, determines that the turning wheels 4 are turned to the right side when the absolute value of the right end separation angle $\Delta\theta r$ is less than the end separation angle threshold value $\Delta\theta th$, and determines that the turning wheels 4 are turned to the left side when the absolute value of the left end separation angle $\Delta\theta l$ is less than the end separation angle threshold value $\Delta\theta th$. Accordingly, it is possible to easily determine the direction in which the turning wheels 4 are turned based on the absolute values of the right end separation angle $\Delta\theta r$ and the left end separation angle $\Delta\theta l$.

This embodiment can be modified as follows. This embodiment and the following modified examples can be combined with each other unless technical confliction arises. In the above embodiment, the direction in which the turning wheels 4 are turned is determined based on the absolute values of the right end separation angle $\Delta\theta r$ and the left end separation angle $\Delta\theta l$, but the disclosure is not limited thereto and the direction in which the turning wheels 4 are turned may be determined, for example, based on the absolute steering angle $\theta s$.

In the above embodiment, when the assist command value Ias* is less than the positive steering angle limit value Ien, the absolute value of the steering angle limit value Ien is set to the rated current Ir even in a state in which turning steering to the right side is performed and return steering is not yet performed. However, the disclosure is not limited thereto and it may be determined whether the sign of the assist command value Ias* is negative in addition to whether the assist command value Ias* is less than the positive pre-adjustment steering angle limit value Ienb and the absolute value of the steering angle limit value Ien may be set to the rated current Ir only when the sign of the assist command value Ias* is negative. With this configuration, the absolute value of the q-axis current command value Iq* when the steering angle limit value Ien is used as the limit value Ig has the same magnitude as in the above embodiment.

Similarly, when steering is performed to the left side, it is determined whether the sign of the assist command value Ias* is positive in addition to whether the assist command value Ias* is equal to or greater than the negative pre-adjustment steering angle limit value Ienb, and the absolute value of the steering angle limit value Ien may be set to the rated current Ir only when the sign of the assist command value Ias* is positive.

In the above embodiment, when steering is performed to the right side, the absolute value of the steering angle limit value Ien is set to the rated current Ir when the assist command value Ias* is less than the positive pre-adjustment steering angle limit value Ienb, but the disclosure is not limited thereto and the absolute value of the steering angle limit value Ien may be set to a value less than the rated current Ir when the increase of the end separation angle $\Delta\theta$ is not regulated. Similarly, when steering is performed to the left side, the absolute value of the steering angle limit value Ien may be set to a value less than the rated current Ir when the assist command value Ias* is equal to or greater than the negative pre-adjustment steering angle limit value Ienb.

In above embodiment, by monitoring the rotation of the motor 21 even when the ignition switch is turned off, the rotation speed of the motor 21 from the origin is normally integrated and the absolute motor angle and the absolute steering angle $\theta s$ are detected. However, the disclosure is not limited thereto and, for example, a steering sensor that detects a steering angle as an absolute angle may be provided, the rotation speed of the motor 21 from the origin may be integrated based on the steering angle detected by the steering sensor and the reduction gear ratio of the reduction gear mechanism 22, and the absolute motor angle and the absolute steering angle $\theta s$ may be detected.

In the above embodiment, end contact relaxation control is performed by limiting the assist command value Ias* to the steering angle limit value Ien, but the disclosure is not limited thereto and end contact relaxation control may be performed, for example, by adding a steering reaction component increasing as it approaches the rack end position, that is, a component with a sign opposite to the sign of the assist command value Ias*, to the assist command value Ias*. With this configuration, when the end separation angle $\Delta\theta$ is equal to or less than the predetermined angle $\theta1$ and return steering in which the end separation angle $\Delta\theta$ increases is performed, the same operations and advantages as in the above embodiment can be achieved, for example, by setting the steering reaction component to be substantially zero.

In the above embodiment, a guard process is performed on the assist command value Ias*, but the disclosure is not limited thereto and, for example, a guard process may be performed on a value obtained by correcting the assist command value Ias* using a compensation value based on a torque differential value obtained by differentiating the steering torque Th. With this configuration, the value obtained by correcting the assist command value Ias* corresponds to a current command value before being corrected.

In the above embodiment, the limit value setting unit 62 includes the voltage limit value calculating unit 72 that calculates the voltage limit value Ivb based on the source voltage Vb, but the disclosure is not limited thereto and another calculation unit that calculates another limit value based on another state quantity may be provided in addition to or instead of the voltage limit value calculating unit 72. A configuration in which the limit value setting unit 62 does not include the voltage limit value calculating unit 72 and sets the steering angle limit value Ien as the limit value Ig without any change may be employed.

In the above embodiment, a value obtained by subtracting the angle limiting component Iga from the rated current Ir is used as the pre-adjustment steering angle limit value Ienb, but the disclosure is not limited thereto and a value obtained by subtracting the angle limiting component Iga and a current limit value which is determined depending on a motor angular velocity from the rated current Ir may be used as the pre-adjustment steering angle limit value Ienb.

In the above embodiment, the steering control device 1 controls the EPS 2 of a type in which the EPS actuator 6 applies a motor torque to the column shaft 15, but the disclosure is not limited thereto and, for example, the steering control device 1 may control a steering system of a type in which a motor torque is applied to the rack shaft 12 via a ball screw nut. Not limited to the EPS, the steering control device 1 may control a steer-by-wire type steering device in which transmission of power between a steering unit which is operated by a driver and a turning unit that turns the turning wheels is cut off and end contact relaxation control may be performed on a torque command value or a q-axis current command value of a motor of a turning actuator which is provided in the turning unit as in this embodiment.

What is claimed is:

1. A steering control device that controls a steering system including a housing, a turning shaft which is accommodated in the housing to reciprocate, and an actuator which applies a motor torque for turning wheels connected the turning shaft using a motor as a drive source, the steering control device comprising:
    an electronic control unit,
    wherein the electronic control unit is configured to:
    detect an absolute steering angle which is a rotation angle of a rotation shaft which is able to be converted into a turning angle of the turning wheels and which is expressed as an absolute angle including a range greater than 360°;
    calculate a current command value corresponding to a target value of the motor torque which is output from the motor;
    control driving of the motor such that an actual current value which is supplied to the motor reaches the current command value;
    store an end-position-corresponding angle which is an angle indicating an end position at which movement of the turning shaft is regulated by an end contact of the turning shaft coming into contact with the housing and which is correlated with the absolute steering angle;
    perform end contact relaxation control for correcting the current command value such that a decrease of an end separation angle indicating a distance of the absolute steering angle from the end-position-corresponding angle is regulated when the end separation angle is equal to or less than a predetermined angle;
    calculate the current command value such that an increase of the end separation angle is not regulated by the end contact relaxation control when the end separation angle is equal to or less than the predetermined angle,
    calculate a steering angle limit value which decreases based on a decrease of the end separation angle when the end separation angle is equal to or less than the predetermined angle;
    perform the end contact relaxation control by limiting the absolute value of the current command value to the steering angle limit value;
    calculate an angle limiting component which increases based on the decrease of the end separation angle when the end separation angle is equal to or less than the predetermined angle;
    calculate the steering angle limit value based on a pre-adjustment steering angle limit value which is obtained by subtracting the angle limiting component from a rated current of the motor; and
    set the absolute value of the steering angle limit value to the rated current when the end separation angle is equal to or less than the predetermined angle and the end separation angle increases.

2. The steering control device according to claim 1, wherein: when the sign of the current command value for causing the motor to generate the motor torque for turning the turning wheels to one side of right and left sides is defined as being positive and the sign of the current command value for causing the motor to generate the motor torque for turning the turning wheels to the other side is defined as being negative,
    the electronic control unit is configured to set the absolute value of the steering angle limit value to the rated current when the turning wheels are turned to the one side, the end separation angle is equal to or less than the predetermined angle, and the current command value before being corrected is less than a positive pre-adjustment steering angle limit value and to set the absolute value of the steering angle limit value to the pre-adjustment steering angle limit value when the turning wheels are turned to the one side, the end separation angle is equal to or less than the predetermined angle, and the current command value before being corrected is equal to or greater than the positive pre-adjustment steering angle limit value; and
    the electronic control unit is configured to set the absolute value of the steering angle limit value to the rated current when the turning wheels are turned to the other side, the end separation angle is equal to or less than the predetermined angle, and the current command value before being corrected is greater than a negative pre-adjustment steering angle limit value and to set the absolute value of the steering angle limit value to the pre-adjustment steering angle limit value when the turning wheels are turned to the other side, the end separation angle is equal to or less than the predetermined angle, and the current command value before being corrected is equal to or less than the negative pre-adjustment steering angle limit value.

3. The steering control device according to claim 2, wherein the electronic control unit is configured to:
- compare a one-side end separation angle indicating a distance of the absolute steering angle from the end-position-corresponding angle on the one side and an other-side end separation angle indicating a distance of the absolute steering angle from the end-position-corresponding angle on the other side with a preset end separation angle threshold value;
- determine that the turning wheels are turned to the one side when the absolute value of the one-side end separation angle is less than the end separation angle threshold value; and
- determine that the turning wheels are turned to the other side when the absolute value of the other-side end separation angle is less than the end separation angle threshold value.

* * * * *